United States Patent Office

2,865,948
Patented Dec. 23, 1958

2,865,948

NEW PHOSPHORYLATED HETEROCYCLIC COMPOUNDS AND PROCESSES FOR PREPARING SAME

Raffaello Fusco, Milan, Italy, assignor to Montecatini Società Generale per l'Industria, Mineraria e Chimica, a corporation of Italy No Drawing. Application December 18, 1956
Serial No. 628,971

Claims priority, application Italy March 21, 1953

15 Claims. (Cl. 260—461)

This invention is a continuation-in-part of application Serial No. 417,521 of March 19, 1954, and relates to new and useful phosphorylated heterocyclic compounds and to methods for preparing the same.

From the chemical literature, various examples are known of phosphorylated compounds, wherein the phosphorus atom is included in a ring structure.

Generally, the products in question are cyclic esters of either phosphorous or phosphoric acid with di- or polyvalent alcohols, wherein the heterocyclic ring contains one phosphorus and two oxygen atoms.

Other phosphorylated heterocyclic compounds have been described, containing, besides phosphorus, two nitrogen atoms in the ring.

Heterocyclic compounds containing either one phosphorus, one nitrogen and one oxygen atom; or one phosphorus, one nitrogen and one sulphur atom in the ring do not seem to have been prepared as yet.

It is one of the objects of this invention to provide such hitherto unknown phosphorylated heterocyclic compounds.

Since it was found that these new, phosphorylated heterocyclic compounds exhibit a substantial insecticide activity, it is another object to provide these compounds for insecticidal and fumigating purposes.

It is still another object to provide the methods of preparing these new compounds.

These and other objects and advantages of the present invention will become more clear from the herein following detailed description and from the appended claims.

The herein-claimed phosphorylated heterocyclic compounds have the general formula:

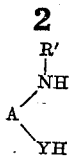

in which R represents a member of the class consisting of alkylamine, dialkylamine, alkoxy amine, alkoxy- and aroxy-groups, R' represents a member of the class consisting of hydrogen, alkyl-, aryl- and alicyclic-groups, A represents a bivalent member of the class consisting of ethylene-, benzo- and cyclohexane-radicals, and X and Y each a member of the class consisting of oxygen and sulphur.

I have found that the formation of these heterocyclic compounds results from the elimination of two mols of hydracid when reacting dihalogen derivatives of phosphorus of the general formula:

$$R-PX.2hal$$

wherein R and X stand for any of the afore-stated substituents for R and X, and hal stands for halogen, with compounds of the general formula:

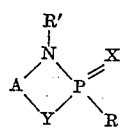

wherein R', A and Y stand for the afore-stated substituents for R', A and Y. Thus, the last-named compounds contain a primary or secondary amino group simultaneously with a hydroxyl or sulphydryl group, or such other groups that the formation is possible of a ring containing the phosphorus atom, the restriction being, however, that the —NHR' and —YH groups shall be located in the 1–2 or 1–3 position with respect to each other if A is a saturated hydrocarbon group, only in the 1–2 position if A is a cycloparaffin radical, and in the "ortho" or "peri" position if A is an aromatic group.

The general reaction scheme is as follows:

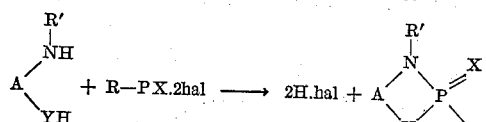

Typical, but not limiting examples of compounds of the type R—PX.2hal are the following: $(CH_3)_2NPSCl_2$ (dimethylamidothionophosphoryl chloride), $$(C_2H_5)_2NPSCl_2$$

(diethylamidothionophosphoryl chloride),

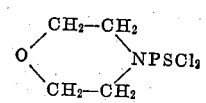

(morpholidothionophosphoryl chloride)

$C_2H_5OPSCl_2$ (ethoxythionophosphoryl chloride)
$C_6H_5OPSCl_2$ (phenoxythionophosphoryl chloride)

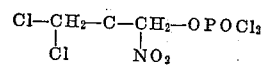

(2,3-dichloro-2-nitro-1-propanol dichlorophosphate)

or, for example, the equivalent bromide compounds.

Examples illustrating the compounds

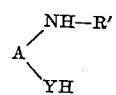

are alkanolamines such as: $R-NH-CH_2-CH_2OH$; $R-NH-CH_2-CH_2-OH$; thioalkanolamines such as $R-NH-CH_2-CH_2-SH$; (R being methyl, ethyl, propyl, phenyl, benzyl, etc.); ortho-aminophenol and ortho aminothiophenol, etc.

Condensation reactions represented by the general scheme may be carried out under different operating conditions, with or without the presence of solvents, at various temperatures depending upon the reactivity of the reactants, and preferably in the presence of a base whose task it is to bind the two hydracid mols set free by the reaction in forming a salt therewith.

Tertiary bases such as trialkylamines, dimethylaniline, pyridine and quinoline appear to be particularly suitable for this purpose.

Moreover, an alternative has been found to the general reaction scheme which may be applied when making some of the products described in this invention.

Said alternative consists in reacting an arylethanolamine with $PCl_3$ according to the equation:

(I)

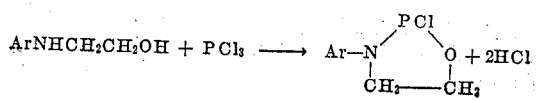

Subsequently sulphur is added to the foregoing α-intermediate according to the equation:

(II)
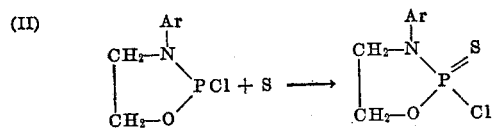

whereupon the resulting β-intermediate is reacted with a di-alkylamine, for example according to the equation:

(III)
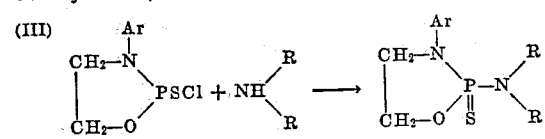

It is furthermore possible to reverse the order of the Reactions II and III and to first react the α-intermediate with the dialkylamine and to subsequently add sulphur, as shown by the following reaction schemes (Equations IV and V) which will be further referred to in the examples:

IV)
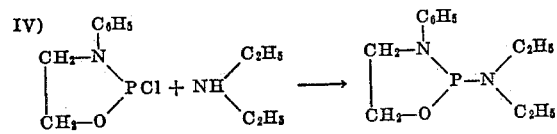

V)
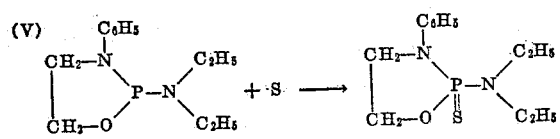

However, this alternative for preparing phosphorated heterocyclic compounds requires that the Ar-group be an aromatic, phenyl or substituted phenyl group.

The following examples will further illustrate the present invention:

EXAMPLE 1

To 0.1 mol of ethylaminoethanol and 0.25 mol of anhydrous pyridine, 0.1 mol of diethylamidothionophosphoryl chloride $(C_2H_5)_2NPSCl_2$ is added, slowly and at a temperature below 20° C.

After standing for twenty-four hours, the reaction mixture is taken up with water, acidified with HCl and extracted with ether, whereupon the ether layer is dehydrated with sodium sulphate, after washing until the reaction is neutral.

The ether is removed and then the residue is purified by distilling at reduced pressure. The reaction product, consisting of 3-ethyl-2-diethylamino-2-thiono-2-phospho-1,3-oxazolidine

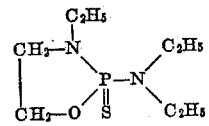

distills at 90–92° C./1 mm. Hg as a colorless oil, scarcely soluble in $H_2O$, readily soluble in alcohol, benzene, chloroform and ligroin.

EXAMPLE 2

By operating similarly, the reaction between o-aminophenol and diethylamidothionophosphoryl chloride produces 2 - diethylamino-2-thione-2-phospho-4,5-benzo-1,3-oxazolidine

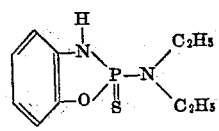

M. P. 110–110.5° C., in form of colorless crystals (from methanol), insoluble in water, soluble in the usual organic solvents.

EXAMPLE 3

Similarly, the reaction between o-aminothiophenol and diethylamidothionophosphoryl chloride results in 2-diethylamino-2-thiono-2-phospho-4,5-benzo-1,3-thiazoline

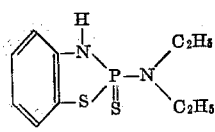

in form of colorless crystals, M. P. 146–148° C. (from 85% ethanol), insoluble in $H_2O$ and ligroin, readily soluble in alcohol, benzene, chloroform.

EXAMPLE 4

Similarly, 2-N-methylamino-1-cyclohexanol and dimethylamidothionophosphoryl chloride give 2 - dimethylamino-2-thiono-2-phospho-3-methyl-4,5-tetramethylene-1,3-oxazolidine

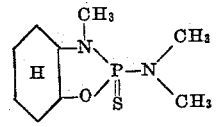

M. P. 59° C., B. P. 125–127° C./2 mm. Hg, insoluble in $H_2O$ and readily soluble in organic solvents.

EXAMPLE 5

Similarly, starting with 2-N-methylamino-1-cyclohexanol and diethylamidothionophosphoryl chloride, 2-diethylamino-2-thiono-2-phospho-3-methyl-4,5-tetramethylene-1,3-oxazolidine

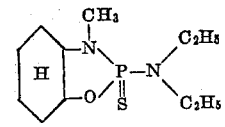

is obtained, B. P. 135–137° C./2 mm. Hg, insoluble in $H_2O$, soluble in organic solvents; refractive index $n_D^{29} = 1.523$.

A characteristic of these new heterocyclic phosphorus compounds is their surprisingly high insecticide activity, as indicated by the following experiments with normal and Octachlor+DDT resistant flies:

*Table 1*

NORMAL FLIES
[Temperature: 24–60° C. Moisture: 90%.]

| Product | g./liter | Percent knockdown after— | | | | Percent mortality after 20 hours |
|---|---|---|---|---|---|---|
| | | 10' | 30' | 60' | 120' | |
| compound of Ex. 1 | 0.24 | 40 | 96 | 97 | 100 | 93 |
| compound of Ex. 2 | 0.24 | 0 | 0 | 0 | 0 | 56 |
| compound of Ex. 3 | 0.24 | 18 | 40 | 95 | 100 | 100 |
| compound of Ex. 4 | 0.08 | 0 | 35 | 80 | 96 | 100 |
| compound of Ex. 5 | 0.24 | 10 | 90 | 100 | 100 | 100 |

*Table 2*

OCTACHLOR + DDT RESISTANT FLIES
[Temperature: 24–26° C. Moisture: 90%.]

| Product | g./liter | Percent knockdown after a time of— | | | | Percent mortality after 20 hours |
|---|---|---|---|---|---|---|
| | | 10' | 30' | 60' | 120' | |
| compound of Ex. 1 | 0.24 | 0 | 100 | 100 | 100 | 66 |
| compound of Ex. 2 | 0.24 | 0 | 0 | 0 | 0 | 55 |
| compound of Ex. 3 | 0.24 | 20 | 60 | 95 | 95 | 96 |
| compound of Ex. 4 | 0.08 | 0 | 0 | 35 | 75 | 100 |
| compound of Ex. 5 | 0.24 | 5 | 30 | 75 | 75 | 100 |

Some of these compounds are also useful as fumigants, as indicated by the following experiments:

Table 3
NORMAL FLIES
[Temperature: 24-26° C. Moisture: 90%.]

| Product | g./m.² | Percent knockdown after— | | | | Percent mortality after 20 hours |
|---|---|---|---|---|---|---|
| | | 10' | 30' | 60' | 120' | |
| compound of Ex. 4 | 0.08 | 0 | 0 | 0 | 0 | 100 |
| compound of Ex. 5 | 0.24 | 0 | 0 | 0 | 0 | 64 |

Table 4
OCTACHLOR + DDT RESISTANT FLIES
[Temperature: 24-26° C. Moisture: 90%.]

| Product | g./m.² | Percent knockdown after— | | | | Percent mortality after 20 hours |
|---|---|---|---|---|---|---|
| | | 10' | 30' | 60' | 120' | |
| compound of Ex. 4 | 0.08 | 0 | 0 | 0 | 0 | 100 |
| compound of Ex. 5 | 0.24 | 0 | 0 | 0 | 0 | 36 |

As indicated, the compound of Example 4 possesses a particularly remarkable insecticidal power and is also useful as a fumigant.

I claim:

1. Phosphorylated heterocyclic compounds of the general structure

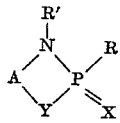

wherein R represents

R'' being a lower alkyl, R' represents a member of the group consisting of hydrogen and lower alkyls, A represents a member of the group consisting of bivalent ethylene-, benzo- and cyclo-hexane radicals, and X and Y represent each a member of the class consisting of oxygen and sulphur.

2. Phosphorylated heterocyclic compounds according to claim 1 wherein X represents sulphur and Y represents oxygen.

3. Phosphorylated heterocyclic compounds according to claim 1 wherein X and Y represent sulphur.

4. 3-ethyl-2-diethylamino - 2 - thiono - 2 - phospho-1,3-oxazolidine.

5. 2-diethylamino-2-thiono-2-phospho - 4,5 - benzo-1,3-oxazolidine.

6. 2-diethylamino-2-thiono-2-phospho - 4,5 - benzo-1,3-thiazoline.

7. 2-dimethylamino-2-thiono-2-phospho - 3 - methyl-4,5-tetramethylene-1,3-oxazolidine.

8. 2-diethylamino-2-thiono-2-phospho - 3 - methyl-4,5-tetramethylene-1,3-oxazolidine.

9. The process for preparing phosphorylated heterocyclic compositions of the general structure

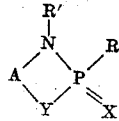

which comprises reacting, for a period and at a temperature sufficient to complete the reaction, about equimolar amounts of a phosphorus compound having the general structure R—PX.2hal wherein R represents

R'' being a lower alkyl, X represents a member of the class consisting of oxygen and sulphur and hal stands for halogen, with a compound having the general structure

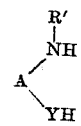

wherein R' represents a member of the group consisting of hydrogen and lower alkyls, A represents a member of the group consisting of bivalent ethylene-, benzo- and cyclohexane-radicals and Y represents a member of the class consisting of oxygen and sulphur, and separating liberated hydracid from the resulting reaction product.

10. The process according to claim 9, wherein the reaction mixture comprises a tertiary base in an amount sufficient to bind liberated hydracid.

11. A process for manufacturing 3-ethyl-2-diethylamino-2-thiono-2-phospho-1,3-oxazolidine, which comprises reacting N-ethylaminoethanol with diethylamidothionophosphoryl chloride in the presence of anhydrous pyridine, at a temperature below 20° C.

12. A process for manufacturing 2-diethylamino-2-thiono-2-phospho-4,5-benzo-1,3-oxazolidine, which comprises reacting o-aminophenol with diethylamidothionophosphoryl chloride in a basic medium.

13. A process for manufacturing 2-diethylamino-2-thiono-2-phospho-4,5-benzo-1,3-thiazoline, which comprises reacting o-aminothiophenol and diethylamidothionophosphoryl chloride in the presence of a base.

14. A process for obtaining 2-dimethylamino-2-thiono-2-phospho-3-methyl-4,5-tetramethylene - 1,3 - oxazolidine according to claim 9, which comprises reacting 2-N-methyl-amino-1-cyclohexanol with dimethylamidothionophosphoryl chloride.

15. A process for obtaining 2-diethylamino-2-thiono-2-phospho-3-methyl-4,5-tetramethylene - 1,3 - oxazolidine according to claim 9, which comprises reacting N-methylamino - 1 - cyclohexanol with diethylamidothionophosphoryl chloride.

No references cited.